United States Patent [19]
Shen et al.

[11] Patent Number: 4,759,605
[45] Date of Patent: Jul. 26, 1988

[54] APPARATUS FOR COUPLING LIGHT BETWEEN AN OPTICAL FIBER AND A LIGHT ELEMENT

[75] Inventors: Nelson M. Shen, San Jose; Marc F. Moisson, Los Altos, both of Calif.

[73] Assignee: Raychem Corporation, Menlo Park, Calif.

[21] Appl. No.: 115,580

[22] Filed: Oct. 23, 1987

Related U.S. Application Data

[63] Continuation of Ser. No. 755,407, Jul. 15, 1985, abandoned.

[51] Int. Cl.⁴ ............................................. G02B 6/42
[52] U.S. Cl. ............................. 350/96.15; 350/96.16; 350/96.2
[58] Field of Search ............... 350/96.15, 96.16, 96.18, 350/96.2

[56] References Cited

U.S. PATENT DOCUMENTS 3,936,631  2/1976  Muska ................................. 250/277
4,398,795  8/1983  Palmer .............................. 350/96.19
4,557,550  12/1985 Beals et al. ........................ 350/96.15
4,618,212  10/1986 Ludington et al. ........... 350/96.15 X

FOREIGN PATENT DOCUMENTS 2847488  5/1980  Fed. Rep. of Germany .
2507787  12/1982 France .
59-45419  9/1982  Japan .

Primary Examiner—John Lee
Assistant Examiner—John Ngo
Attorney, Agent, or Firm—Dennis E. Kovach; Herbert G. Burkard

[57] ABSTRACT

An apparatus for injecting light into or withdrawing light from an optical fiber using a resiliently deformable material includes a hard transparent member disposed in contact with a surface of the resiliently deformable material in a vicinity of a light element which minimizes material creep of the resiliently deformable material in a vicinity of the light element which stabilizes a coupling and decoupling efficiency with an optical fiber.

13 Claims, 1 Drawing Sheet

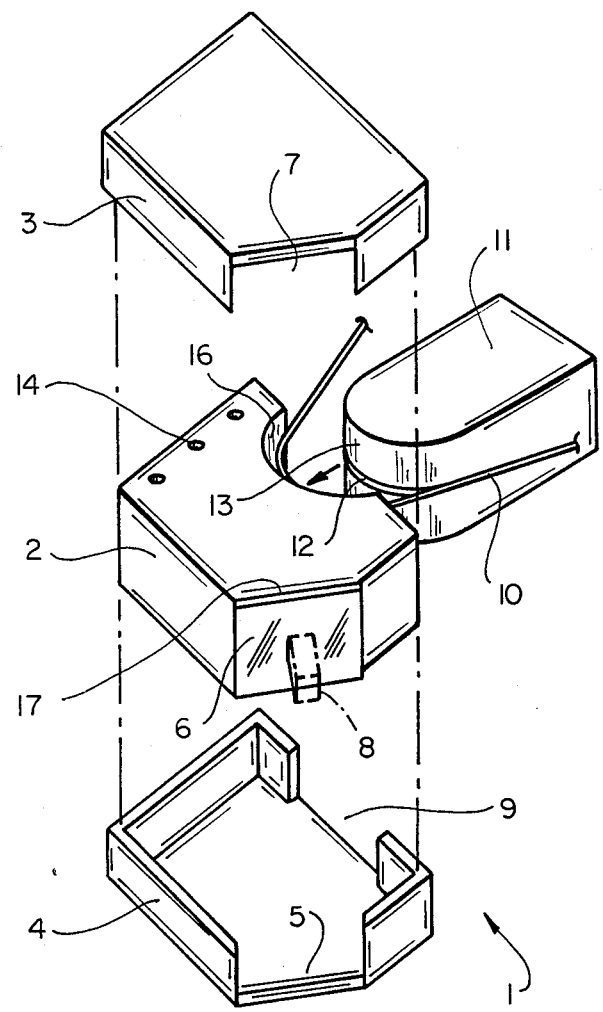
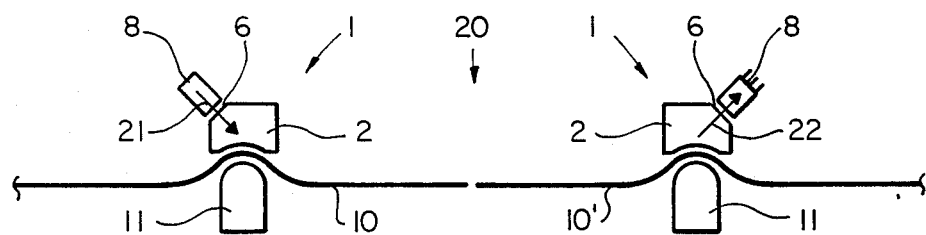
FIG_1
FIG_2

APPARATUS FOR COUPLING LIGHT BETWEEN AN OPTICAL FIBER AND A LIGHT ELEMENT

This application is a continuation of application Ser. No. 755,407, filed July 15, 1985, now abandoned.

BACKGROUND OF THE INVENTION

The present invention relates to an apparatus for injecting light into, and withdrawing light from, an optical fiber using either a light source or optical detector, respectively.

Optical fibers, due to their extremely high bandwidth capability and electromagnetic interference (EMI) immunity, have been extensively developed in recent years and are rapidly replacing other types of communication media.

Numerous methods and apparatuses have been developed for injecting light into, and withdrawing light from, optical fibers so that information can be transmitted thereon and received therefrom. Many of these methods and apparatuses require that the optical fiber be terminated in one way or another which is disadvantageous since taps used for either injecting light into or withdrawing light from optical fibers at such terminations must be connectorized to the optical fiber resulting in connectorization losses.

Campbell et al., European Publication No. 0,063,954, and U.S. Ser. No. 602,242 filed April 19, 1984, the disclosure of which is incorporated herein by reference, discloses a method and means for injecting light into and withdrawing light from an optical fiber at a bend without requiring termination of the optical fiber so as to allow temporary in situ local launch and detect techniques to be used for aligning optical fibers prior to splicing. Since light is injected into and withdrawn from the optical fiber through its buffer, this method and means is non-destructive and hence does not require optical fiber terminations and connectorization losses associated therewith, and is also very expedient and efficient, especially when compared to other prior art methods and means for light injection and detection. A preferred embodiment disclosed by Campbell et al. is to utilize a resiliently deformable optical coupler for facilitating injection and withdrawal of light into and from the optical fiber.

SUMMARY OF THE INVENTION

It is an object of the present invention to improve upon the coupling efficiency and stability of the method and means disclosed by Campbell et al., and specifically to provide an apparatus which is capable of either injecting light into or withdrawing light from an optical fiber more efficiently and in a more stabilized manner, a preferred use of the invention being in an apparatus for aligning and splicing optical fibers.

In accordance with the invention, it has been discovered that when a deformable material, particularly a resiliently deformable material, is utilized for injecting light into and withdrawing light from an optical fiber, the resiliently deformable material tends to creep, and even though a position between a light element and the optical fiber is mechanically held constant, the creeping of the resiliently deformable material creates a time varying lens effect which changes a coupling and decoupling efficiency making light injection and detection somewhat unstable. According to the invention, stability is increased by a factor in excess of an order of magnitude by disposing the optical fiber in contact with a first surface of the resiliently deformable material, and disposing a hard transparent member in contact with a second surface of the resiliently deformable material, the first and second surfaces being oriented such that light passes through both of them when passing between the optical fiber and the light element. The hard transparent member maintains a constant shape when the optical fiber is pressed against the first surface which prevents the second surface of the optical fiber from changing shape and changing a lens effect induced by the resiliently deformable material due to pressure exerted thereon at the first surface.

The invention further includes means for totally enclosing and containing the resiliently deformable material about all external surfaces thereof in conjunction with the hard transparent member except for the first surface so as to further minimize creep in other directions of the resiliently deformable material, and small holes or voids are also preferably formed in the resiliently deformable material at a location thereof relatively remote from the first and second surfaces so as to allow the first surface of the resiliently deformable material to best conform with the optical fiber when pressed thereagainst.

BRIEF DESCRIPTION OF THE DRAWINGS

FIG. 1 is an exploded perspective view illustrating a preferred embodiment of the invention for coupling and decoupling light through a side of an optical fiber; and FIG. 2 is a plan view of an apparatus for aligning first and second fibers by coupling and decoupling, as illustrated in FIG. 1.

DESCRIPTION OF THE PREFERRED EMBODIMENTS

Referring to FIG. 1, an apparatus 1 suitable for either injecting light into or withdrawing light from an optical fiber 10 using a light element 8, which an alternatively comprise either a light source or a light detector 8, utilizes a resiliently deformable material 2, such as an elastomeric material, for facilitating a coupling and decoupling efficiency between the light element 8 and the optical fiber 10. The resiliently deformable material 2 includes a first surface 16 which is curved about a predetermined bend radius profile optimal for coupling or decoupling light, and further includes a second surface 17 opposite the first surface 16, the first and second surfaces 16, 17 being oriented with respect to the optical fiber 10 and the light element 8 such that light being coupled and decoupled from the optical fiber passes through both of these surfaces. A hard transparent member 6, such as glass, is disposed in intimate contact with the resiliently deformable material 2 in a vicinity of the second surface 17, with the light element 8 being positioned in close proximity to the hard transparent member 6 so as to be capable of either injecting light through, or detecting light passing through, the hard transparent member 6 which is either coupled or decoupled from the optical fiber 10.

According to the embodiment of FIG. 1, first and second members 3, 4 having openings 5, 7 therein are disposed around the resiliently deformable material 2 so as to contain and enclose the resiliently deformable material 2 about all external surfaces thereof in conjunction with the hard transparent member 6 except for the first surface 16. To this end, the first and second members 3, 4 have further openings 9 therein in a vicinity of the first surface 16. A bending element 11 having a groove 12 on a bent surface 13 thereof is adapted for pressing the optical fiber 10 against the first surface 16 so as to maintain the optical fiber 10 in a bent configuration, and to position the optical fiber at a precise location on the first surface 16 to obtain optimum coupling and decoupling efficiency. Finally, holes 14 are disposed in the resiliently deformable material at a location relatively remote from a line of sight between the hard transparent member 6 and surface 16 so as to allow slight deformation of the material 2 when the optical fiber 10 is pressed against surface 16. Accordingly, the material 2 can slightly deform about the optical fiber 10 in a vicinity of the surface 16 so as to achieve good optical contact therewith. Though holes 14 are illustrated, small internal voids within the material 2 could accomplish the same deformation allowable means, and alternatively the first and second members 3, 4 could have further small openings in surfaces thereof remote from the first and second surfaces 16, 17 of the material 2 to allow slight deformation of the material 2 so as to achieve good contact with the optical fiber 10.

In operation, for the case of light injection, the light element 8 can comprise either a light emitting diode (LED) or a laser, and is accurately positioned relative to a coupling point on the optical fiber or on the surface 16 so as to precisely direct light toward the surface 16 in a vicinity where an optical fiber 10 is to be disposed. The optical fiber 10 is precisely positioned on the surface 16 by being pressed thereagainst by the bending and holding element 11 having the groove 12 therein. As the fiber 10 is pressed against the surface 16, intimate contact therewith is achieved, and is preferentially facilitated by provision of the deformation allowable means 14. Since the hard transparent member 6 is disposed in intimate contact with the second surface 17 of the material 2, deformation of the second surface 17 as well as the member 6 is prevented thus eliminating or at least substantially minimizing any change in a lens effect of the material 2 in a vicinity of the second surface 17 when the optical fiber 10 is pressed against the surface 16. Accordingly, elastomeric creep of the material 2 is substantially reduced, an injection efficiency of light to the optical fiber 10 is substantially improved as well as the stability thereof, and alternatively a detection efficiency of light from the fiber 10 is substantially improved as well as the stability thereof. Experiments indicate that the invention achieves in excess of an order of magnitude improvement in stabilization as compared with prior art apparatuses which do not include any means for preventing material creep, for both light injection and detection. In particular, without the container 3, 4, and hard transparent member 6, after 4 minutes of coupling, a 2% change per minute in coupling magnitude is achieved, whereas with the container 3, 4 and member 6, less than 0.2% change per minute in coupling magnitude is realized after 4 minutes of coupling. For light detection, the light element 8 comprises a photodetector rather than an LED or a laser.

FIG. 2 illustrates an apparatus 20 for aligning optical fibers 10, 10' using apparatuses for injecting light and withdrawing light in the direction of arrows 21, 22 using the deformation prevention means 6, optimum alignment being indicated by maximizing detected signal 22. Other embodiments other than fiber splices can equally utilize the invention, such as write taps for injecting optical signals representative of information into a fiber, and read taps for detecting such signals and information.

Though the invention has been described with reference to certain preferred embodiments thereof, the invention is not to be limited thereby. Specifically, the groove 12 on the bending element 8 could be formed on the surface 16, or other means provided for precisely positioning the optical fiber 10 on the surface 16, and the first and second members 3, 4 can comprise separate elements as illustrated or can be a unitary member formed by molding techniques. Other minor modifications to the invention can also be made without departing from the spirit and scope of the present invention, and hence the invention is to be limited only by the appended claims.

What is claimed is:

1. An apparatus for coupling light between an optical fiber and a light element, comprising:
    a light element;
    a resiliently deformable material having a first surface in contact with a first optical fiber;
    means for preventing deformation of a second surface of the resiliently deformable material through which light passes when coupled or decoupled with the first optical fiber through a side thereof, the light element being disposed outside the resiliently deformable material, the deformation prevention means comprising a hard transparent member disposed in contact with the second surface;
    a container for containing and enclosing the resiliently deformable material about all external surfaces thereof in conjunction with the hard transparent member except for the first surface, the container having an opening therein in a vicinity of the hard transparent member, and another opening therein in a vicinity of the first surface.

2. The apparatus of claim 1, the first surface contacting the optical fiber, the light element comprising a light source which emits light which enters the resiliently deformable material at the second surface and enters the side of the optical fiber by passing through the first surface.

3. The apparatus of claim 2, the light element comprising an LED or a laser.

4. The apparatus of claim 1, the first surface contacting the optical fiber, the light element comprising a light detector which detects light which enters the resiliently deformable material at the first surface from a side of the optical fiber and enters the light detector by passing through the second surface.

5. The apparatus of claim 4, the light detector comprising a photodetector.

6. The apparatus of claim 1, the first surface being curved.

7. The apparatus of claim 1, further comprising means for bending and holding the optical fiber against the first surface.

8. The apparatus of claim 7, one of the first surface and the bending and holding means having a groove therein into which the optical fiber is at least partially contained so as to position the optical fiber on the first surface.

9. The apparatus of claim 1, the resiliently deformable material including means to allow deformation thereof when pressure is exerted against the first surface so as to position the optical fiber thereon.

10. The apparatus of claim 9, the deformation allowing means including at least one void in the resiliently deformable material.

11. The apparatus of claim 1, light being coupled or decoupled with the optical fiber through an optical fiber buffer at a side of the optical fiber at a bend of the optical fiber.

12. The apparatus of claim 4, further comprising means for aligning an end of the first optical fiber with an end of a second optical fiber by maximizing an amount of light detected by the light detector.

13. The apparatus of claim 12, further comprising means for injecting light into the second optical fiber through a side thereof, the injecting means comprising a light source, a second resiliently deformable material having a first surface in contact with the second optical fiber, and means for preventing deformation of a second surface of the second resiliently deformable material through which injected light passes, the light source being disposed outside the second material.

* * * * *